(12) United States Patent
Krueger et al.

(10) Patent No.: US 10,682,927 B1
(45) Date of Patent: Jun. 16, 2020

(54) VEHICLE SEAT CONTROL ASSEMBLY

(71) Applicant: Seats Incorporated, Reedsburg, WI (US)

(72) Inventors: Craig Krueger, Reedsburg, WI (US); Daniel J. Ziemer, Baraboo, WI (US); Adam Timothy Lindloff, Reedsburg, WI (US)

(73) Assignee: Seats Incorporated, Reedsburg, WI (US)

( * ) Notice: Subject to any disclaimer, the term of this patent is extended or adjusted under 35 U.S.C. 154(b) by 0 days.

(21) Appl. No.: 16/365,077

(22) Filed: Mar. 26, 2019

(51) Int. Cl.
*B60N 2/02* (2006.01)
*B60N 2/16* (2006.01)

(52) U.S. Cl.
CPC ......... *B60N 2/0296* (2013.01); *B60N 2/1665* (2013.01)

(58) Field of Classification Search
CPC ...... B60N 2/0296; B60N 2/02; B60N 2/1665; B60N 2/16; B60N 2/914
USPC .................................................... 297/284.3
See application file for complete search history.

(56) References Cited

U.S. PATENT DOCUMENTS

| | | |
|---|---|---|
| 4,213,594 A | 7/1980 | Pietsch |
| 4,243,072 A * | 1/1981 | Hoffman ............... F16K 11/074 137/596 |
| 4,461,444 A | 7/1984 | Grassl |
| 4,589,695 A * | 5/1986 | Isono ..................... A47C 7/467 297/284.9 |
| 4,946,145 A | 8/1990 | Kurabe |
| 5,447,178 A * | 9/1995 | Gabrlik ............... F16K 11/0655 137/353 |
| 5,934,749 A | 8/1999 | Pond et al. |
| 6,119,727 A | 9/2000 | Morris |
| 6,796,515 B2 | 9/2004 | Heren |
| 9,381,829 B2 | 7/2016 | Lee |
| 2009/0050220 A1 | 2/2009 | Kang |
| 2009/0096268 A1 | 4/2009 | Stephens |
| 2012/0139304 A1 | 6/2012 | Jang |
| 2015/0210192 A1* | 7/2015 | Benson .................. B60N 2/525 297/217.2 |
| 2019/0134700 A1* | 5/2019 | Dugenne .................. B21J 15/18 |

FOREIGN PATENT DOCUMENTS

| | | |
|---|---|---|
| EP | 1419062 B1 | 1/2007 |
| JP | S5639928 A | 4/1981 |
| JP | 2017124787 A | 7/2017 |
| KR | 200293214 Y1 | 10/2002 |

* cited by examiner

*Primary Examiner* — Mark R Wendell
(74) *Attorney, Agent, or Firm* — Quarles & Brady LLP

(57) ABSTRACT

Embodiments of the invention provide a valve-control assembly for a vehicle seat that includes a pneumatic control valve configured to control at least one seat adjustment function. A control switch is configured to operate the pneumatic control valve, and a cover structure is arranged to one or more of at least partly cover the pneumatic control valve or at least partly surround the control switch. The control switch includes a first tab, and the cover structure includes a second tab. The first tab is configured to engage the second tab, when the control switch is actuated by a predetermined amount, to secure the control switch against movement and thereby secure the pneumatic control valve in an open configuration.

20 Claims, 6 Drawing Sheets

VEHICLE SEAT CONTROL ASSEMBLY

BACKGROUND

In commercial and other vehicles, seats (e.g., driver seats) can be adjusted using seat adjustment devices. For example, the height of a driver seat may be adjusted by a control assembly utilizing pneumatic systems.

In some control assemblies for seat adjustments, a user can control valves and actuators through a control panel that contains switches or other buttons. Each of the switches or buttons can be designed to control at least one adjustment function, although some switches can have more than one function.

SUMMARY

In one aspect, a valve-control assembly for a vehicle seat can include a pneumatic control valve configured to control at least one seat adjustment function. A control button can be configured to operate the pneumatic control valve, and a cover structure can be arranged to one or more of at least partly cover the pneumatic control valve or at least partly surround the control button. The control button can include a first tab, and the cover structure can include a second tab. The first tab can be configured to engage the second tab, when the control button is actuated by a predetermined amount, to secure the control button against movement and thereby secure the pneumatic control valve in an actuated (e.g., open) configuration.

The valve-control assembly can include at least one seat adjustment function controlled by the pneumatic control valve, such as a height adjustment for the vehicle seat. The valve-control assembly can lower the vehicle seat when the pneumatic control valve is in the actuated configuration. The control switch can be configured to be manually engaged to disengage the first tab from the second tab.

The control button can be configured to be manually moved in a first direction to disengage the first tab from the second tab. The control button can be further configured to control the pneumatic control valve to raise a height of the vehicle seat via movement of the control button in the first direction.

The cover structure can include a notch that is configured to receive a hand tool, from outside the vehicle seat, to remove the cover structure from the valve-control assembly. The cover structure can include a cover panel and a switch panel. The switch panel can include the second tab and be secured to the cover panel to at least partly surround the control switch. The pneumatic control valve can be secured to the switch panel.

In some embodiments, the control button can be a rocker switch, and the first tab can be formed on a bottom end of the rocker switch. The control button can be included in a plurality of manual controls for a plurality of seat adjustment functions.

In another aspect, a valve-control assembly can be provided for a vehicle seat with a control valve that is configured to control at least one seat adjustment function. The valve-control assembly can include a control switch configured to be manually actuated to operate the control valve, and a cover structure arranged to one or more of at least partly cover the control valve or at least partly surround the control switch. The control switch can include a switch body and a first catch integrally formed with the switch body. The cover structure can include a switch panel and a second catch integrally formed with the switch panel. The first catch can be configured to engage the second catch, when the control switch is actuated by a predetermined amount, to secure the control switch against movement and thereby secure the control valve in a first configuration.

The first catch can be formed as a first solid tab and the second catch is formed as a second solid tab. The cover structure can further include a cover panel and the switch panel is configured to nest within part of the cover panel. The switch panel is configured to at least partly surround a plurality of manual controls for a plurality of seat adjustment functions. The control switch can be configured to control a height adjustment of the vehicle seat and the first catch can be configured to engage the second catch when the control switch is actuated to fully lower the vehicle seat. The cover panel can include a notch that is configured to receive a hand tool, from outside the vehicle seat, to remove the cover structure from the valve-control assembly and thereby provide access to the control valve.

In still another aspect, a vehicle seat can have a seat portion, a base portion that supports the seat portion, and a valve assembly included in the base portion, including a first pneumatic control valve. The vehicle seat can further include a control switch included in the base portion, the control switch including a first catch and being configured to operate the first pneumatic control valve to raise or lower the seat portion. A second catch can be included on the base portion. The first catch can be configured to engage the second catch, when the control switch is actuated by a predetermined amount, to secure the control switch against movement and thereby secure the first pneumatic control valve to fully lower the seat portion.

The base portion can further include a cover structure. The second catch can be integrally formed as part of the cover structure. The first catch can be integrally formed as part of the control switch. The cover structure can include a notch that is configured to receive a hand tool, from outside the vehicle seat, to remove the cover structure from the base portion and thereby provide access to the valve assembly.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
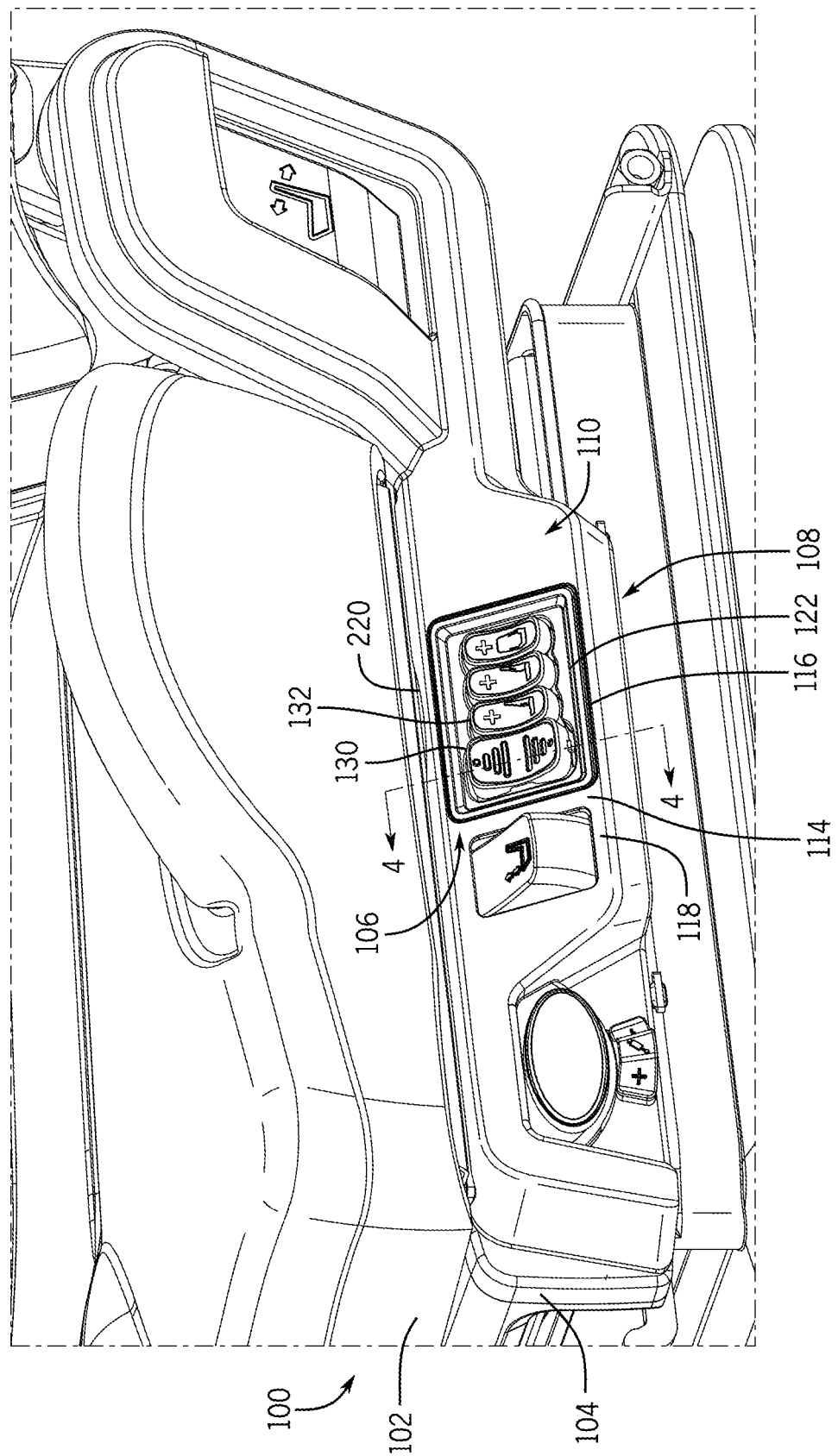
FIG. 1 is an isometric partial view of a vehicle seat, including a valve-control assembly for the vehicle seat according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise defined or limited, directional references such as "top," "bottom," "left," "right," "front," "back," and so on are used as examples only, relative to the particular reference frame or figure associated with the relevant discussion. For example, a feature described as being located on a "top" portion of a body relative to a particular figure or example may not necessarily be located on a top portion of the body, relative to gravity or other features, in every installation or configuration.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some figures may include multiple instances of similar structures or structural relationships. For convenience of presentation, in select figures, only some of these similar structures or relationships may be specifically labeled with a reference number. One of skill in the art will recognize that the features not labeled with reference numbers can include similar aspects and perform similar functions to similar features that are labeled with reference numbers.

In some cases, it may be useful to adjust seats to permit easy entry into and exit from a vehicle cab, among other activities. In this regard, for example, it may be helpful for some drivers to adjust seat height when the drivers enter and exit the cab. For example, movement into and out of a seat may be relatively easy if a driver is able to adjust a seat from an elevated (e.g., driving) position to a lowered (e.g., minimum height) position. This may be particularly useful, for example, for elevated or space-constrained cabs.

Some vehicle seats can be configured to allow a user to adjust the height of the vehicle seat between an elevated-height position and a minimum-height position by manually engaging a control button, such as a rocker switch. This can allow for highly customized adjustment of the vehicle seat. However, conventional arrangements may require a user to continually interact with a control-assembly to effect ongoing adjustment of a seat. Accordingly, it may be useful to provide improvements that allow a user to quickly and efficiently move the vehicle seat to a minimum-height (or other) position. For example, it may assist users in exiting or entering the vehicle cab if the seat can be moved to—and held in—a minimum-height position without ongoing action by the users.

Embodiments of the present invention can provide a valve-control assembly that can beneficially address these, and other, aspects of vehicle seat adjustment. Generally, for example, a valve-control assembly for a vehicle seat can include a control button with a catch that can hold the control button in an actuated position. Usefully, this arrangement can help to cause a seat to move to a particular position without ongoing manual engagement of the button by a user. For example, in some embodiments, a valve-control assembly can be configured so that a user can move a seat to a particular configuration by actuating a rocker switch (or other button) with a discrete and limited motion such as a one-time, single finger-press (and release), rather than with a protracted actuation such as continuously holding down the rocker switch (or other button). In some configurations, accordingly, a user can use a quick, single action to cause a seat to move to a minimum-height position and thereby allow entrance into and egress from the cab with maximal ease.

In some embodiments, to provide this functionality, a rocker switch or other button for a vehicle seat can include a first mechanical catch (e.g., on a bottom end of the switch) that engages a second mechanical catch on a cover structure or other feature of the seat. Once engaged with the first catch, the second catch can retain the rocker switch or other button in a secured position, such as may temporarily prevent the rocker switch or other button from rotating or otherwise moving (e.g., returning to a "home" location). Thus, the first catch and the second catch, rather than the user, can retain the rocker switch in the secured position. Further, in some cases, the secured position can correspond to an actuated position, such as a position in which the rocker switch or other button actuates a pneumatic control valve to lower the vehicle seat from an elevated position to a minimum position. Accordingly, in some cases, the engagement of the first and second catches can cause a valve to be held in an actuated (e.g., open) position so that the relevant seat is automatically moved to a lowered position.

Relatedly, in some conventional arrangements, it may be difficult to access components of a valve assembly, including a valve-control assembly, for maintenance or other tasks. Accordingly, some embodiments of the invention can include a valve-control assembly with a cover structure (e.g., a cover panel and attached switch panel) that is capable of being quickly removed by a hand tool, from outside the vehicle seat. For example, some cover structures according to the invention can include a notch along a top (or other) edge that can provide a space for insertion of the head of a hand tool, such as a screwdriver, to help pry the cover structure away from other structures of the vehicle seat. In this way, for example, the cover structure can be quickly and easily removed to allow access for maintenance of a valve-control assembly, a control valve assembly, or other components. For example, in some arrangements, with the cover structure removed, a user can readily access a bank of pneumatic control valves that were previously enclosed by the cover structure.

In some embodiments, a cover structure can include a cover panel and a smaller switch panel that is secured to (e.g.

nested with) the cover panel to surround control switches or other buttons of a valve-control assembly. In such a case, for example, the switch panel may be removed from the cover panel for more limited access to control valves or valve controls, thereby retaining the cover panel in its secured position. Further, in some cases, such a switch panel can also include a catch for engaging a control button, such as described above.

As one example, referring to FIG. 1, a vehicle seat 100 includes a seat portion 102 located above and supported by a base portion 104. The seat portion 102 is generally L-shaped and is generally configured to support a user, e.g., a driver, in a seated position within a vehicle cab. A valve assembly 106, including a valve-control assembly 108, resides within the base portion 104 of the vehicle seat 100 below the seat portion 102.

Figure 4:
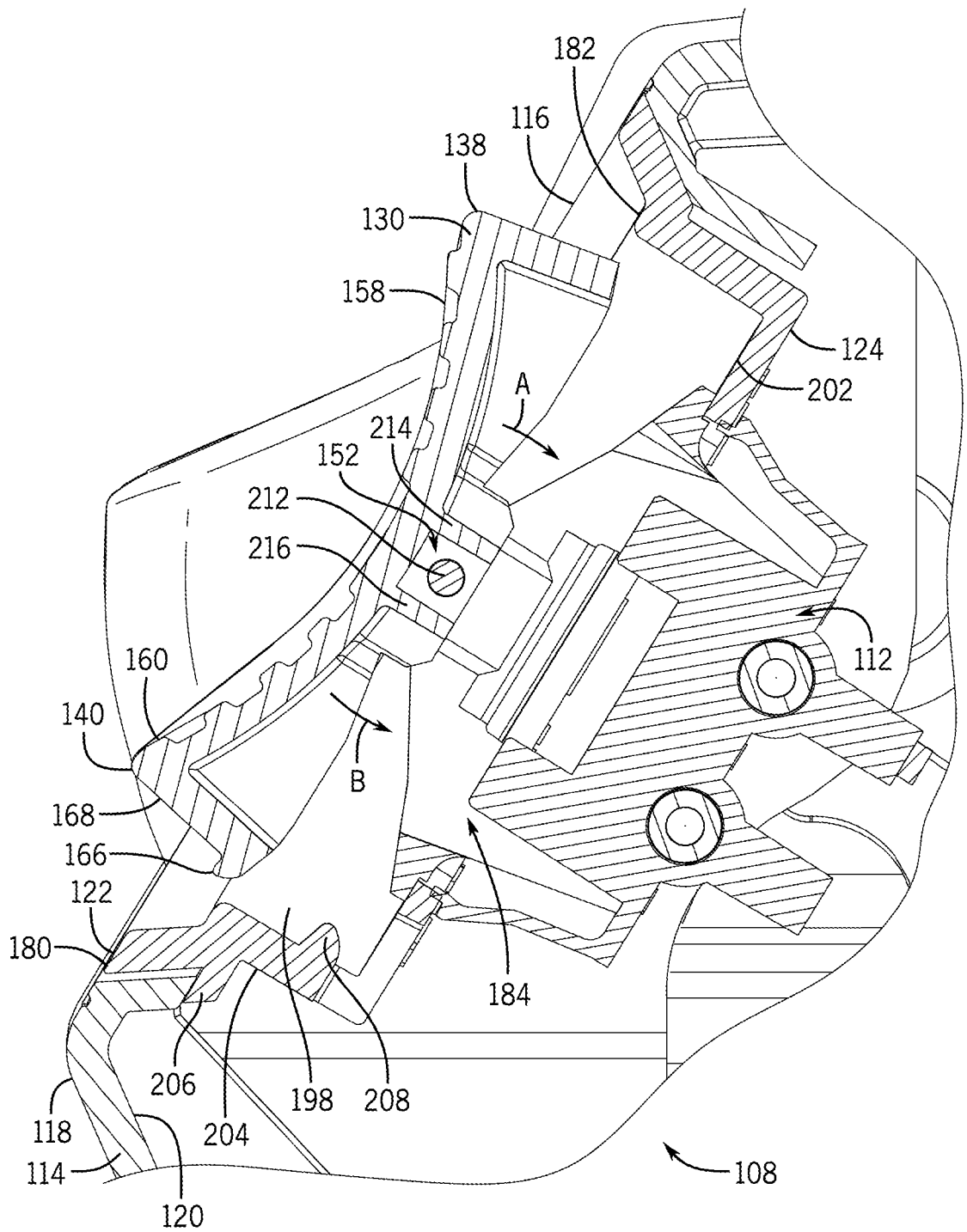
FIG. 4 is a sectional partial view of the valve-control assembly of FIG. 1 in a disengaged state, taken along the lines 4-4 of FIG. 1.

The base portion 104 also includes a cover structure 110 arranged to at least partly cover a pneumatic control valve 112 (partially shown in FIG. 4). The cover structure 110 extends at least partially along the seat portion 102 and accordingly can cover features of the seat 100 other than the control valve 112 (e.g., other components of the valve assembly 106).

Still referring to FIG. 1, the cover structure 110 includes a cover panel 114 and a switch panel 116. Generally, a switch panel may be fastened to a cover panel using a variety of known fastening techniques, including snap-fit arrangements, adhesives, fasteners, and so on. For example, as also discussed below, the switch panel 116 is configured to nest within the cover panel 114, such that the switch panel 116 snaps into place within the cover panel 114 during installation. The cover panel 114 has an external surface 118 visible from outside the vehicle seat 100, an internal surface 120 (see FIG. 4) opposite the external surface 118. Similarly, the switch panel 116 has an outer surface 122 visible from outside the vehicle seat 100 and an inner surface 124 (see FIG. 4) opposite the outer surface 122.

With continued reference to FIG. 1, the valve-control assembly 108 further includes a control button 130, illustrated as a control switch, that is configured to operate the pneumatic control valve 112 (see FIG. 4). In the embodiment illustrated, the pneumatic control valve 112 is configured to raise or lower the vehicle seat 100 using pneumatics, i.e., compressed gases, although control of other functions may be possible in other embodiments. When actuated, for example, the pneumatic control valve 112 may control flow of compressed gases in order to perform a raising or lowering function, to adjust a height of the seat between an elevated (e.g., driving) position and a minimum (e.g., fully lowered) position. In some embodiments, other control buttons can be included, such as control buttons 132 formed as additional control switches, as may be useful to control other seat-adjustment functions.

For protective, aesthetic, or other reasons, a cover structure may sometimes be arranged to at least partly surround or otherwise cover one or more control switches or other control buttons. For example, in the illustrated embodiment, the switch panel 116 substantially surrounds the control buttons 130, 132. In general, although the switch panel 116 is generally rectangular, other switch panels can be squared, circular, or any other shape suited to at least partly surround relevant control buttons. As illustrated in FIG. 1, the control buttons 130, 132 extend beyond the outer surface 122 of the switch panel 116 as may help to facilitate manual actuation. In some cases, however, the outer surface 122 of the switch panel 116 may be flush (i.e., even) with one or more of the control buttons 130, 132 or otherwise configured.

In different embodiments, a cover structure can be secured to a seat in different ways, such as with a variety of well-known fasteners. In some embodiments, a cover structure can be configured to be attached to a vehicle seat by means of fasteners that can be engaged or disengaged without the direct use of tools. For example, the cover structure 110 can be secured to the base portion 108 of the vehicle seat 100 using snap-in or other tool-less fasteners, such as snap-fit pegs or automatically-engaged clasps (not shown) that are provided on the internal surface 120 of the cover panel 114 (see FIG. 4).

Figure 2:
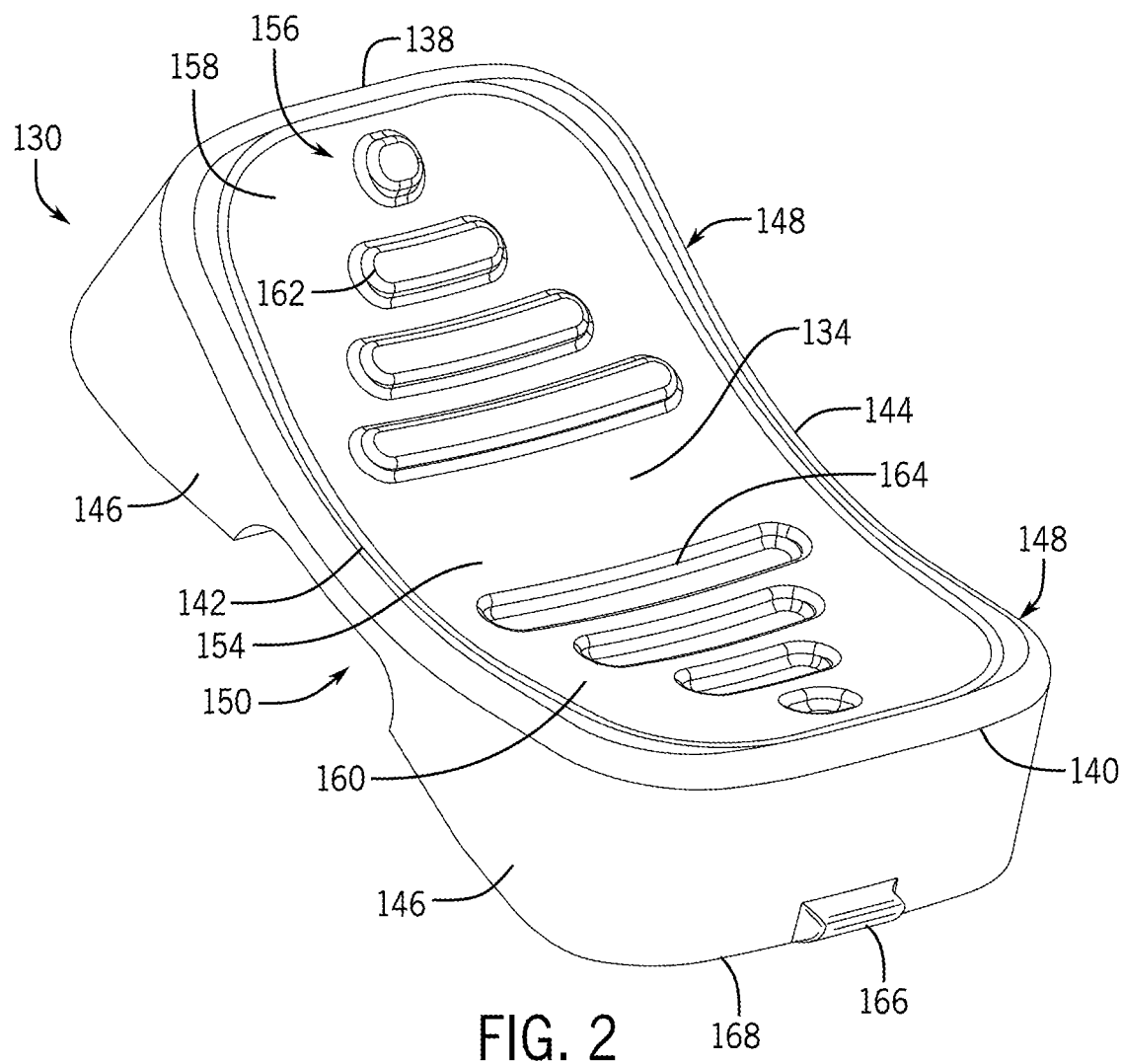
FIG. 2 is an isometric bottom, front, left side view of a control switch for the valve-control assembly of FIG. 1.

Control buttons according to embodiments of the invention, including the control button 130, can be configured in a variety of ways in order to provide appropriate functionality and accommodate a relevant catch, as discussed above. For example, as illustrated in FIG. 2 in particular, the control button 130 is configured as a rocker switch. The rocker switch 130 is generally rectangular, having a midpoint 134, a top edge 138, a bottom edge 140, a first side edge 142 and a second side edge 144. The rocker switch 130 has a first side 146 and second side 148, both of which are partially partitioned by a medial cut 150. The medial cut 150 interrupts the first side 146 and second side 148 near the midpoint 134 of the rocker switch. In other embodiments, however, other configurations are possible, including rocker or other switches with non-rectangular, non-symmetrical, or other geometries.

Still referring to FIG. 2, the medial cut 150 is generally crescent-shaped to permit movement of the switch 130 relative to a pivot 152 (see FIG. 4). Thus, for example, the rocker switch 130 can be pivotally rotated, i.e., rocked, about the pivot 152 to operate the pneumatic control valve 112 (see also FIGS. 4 and 5). As also alluded to above, however, buttons in other embodiments can be differently configured and actuated.

To assist in user engagement, in the embodiment illustrated, the rocker switch 130 includes a front face 154 having indicia 156 disposed thereon. In the illustrated embodiment, the indicia 156 are configured to correspond to, and provide different tactile engagement with, a top portion 158 and a bottom portion 160 of the rocker switch 130. For example, the top portion 158 of the front face 154 includes at least one rib 162 and the bottom portion 160 of the front face 154 includes at least one cavity 164. Accordingly, a user who is manually actuating the rocker switch 130 can generally feel the difference between the at least one rib 162 and the at least one cavity 164 and thereby manually determine which portion of the front face 154 is being actuated.

In other embodiments, other configurations are possible. For example, indicia may sometimes correspond to different lateral sides of a button, such as a switch configured to be laterally moved to adjust a seat, or may exhibit different forms than are illustrated in FIG. 2.

With continued reference to FIG. 2, the front face 154 is concave along its length, so that the top portion 158 and the bottom portion 160 are generally coplanar near the midpoint 134 and curve upward toward the respective top edge 138 and bottom edge 140. Optionally, the front face 154 can be planar, or convex, or even irregularly shaped. In addition, similar configurations may be provided on other control buttons or switches (e.g., the control buttons 132) to control other seat adjustment functions.

In some embodiments, a circular or other button, rather than or in addition to the rocker switch 130, may be used to adjust the height of the vehicle seat 100. Still further, the actions described in connection with the rocker switch 130 may be used to perform additional or alternative seat adjustment functions, other than height adjustment. For example, the rocker switch 130 may be configured to control other seat adjustments, or another button (e.g., configured similarly to the buttons 132 as shown in FIG. 1) may be configured to control seat height.

In some embodiments, a control switch such as the rocker switch 130 may be particularly suited to include a catch in order to allow the control switch to be automatically retained in a particular orientation. As depicted in FIG. 2, for example, a first catch 166 configured as a triangular tab or detent with a generally flat engagement face is formed on a bottom end 168 of the rocker switch 130. The first catch 166 is positioned on the bottom end 168 below the bottom edge 140 and between the first side 146 and the second side 148. The first catch 166 extends laterally away from the bottom end 168 as a solid, fixed tab. As such, the first catch 166 may be integrally formed with the rocker switch 130.

In other embodiments, other configurations are possible. For example, the first catch 166 (or another catch according to embodiments of the invention) may be formed as a hook, an extended lip, a recess, or otherwise. In some embodiments, a catch may be formed separately from the rocker switch 130 and then affixed to the bottom end 168 thereof. In some embodiments, a catch may be disposed elsewhere on the rocker switch 130, such as on the front face 154 or on one of the first or second sides 146, 148 of the rocker switch 130. Optionally, multiple catches can be provided on the rocker switch 130, on one or more of its surfaces. In some configurations, a catch may be manually (or otherwise) adjustable, such as being configured to be extendable or retractable by a user.

Figure 3:
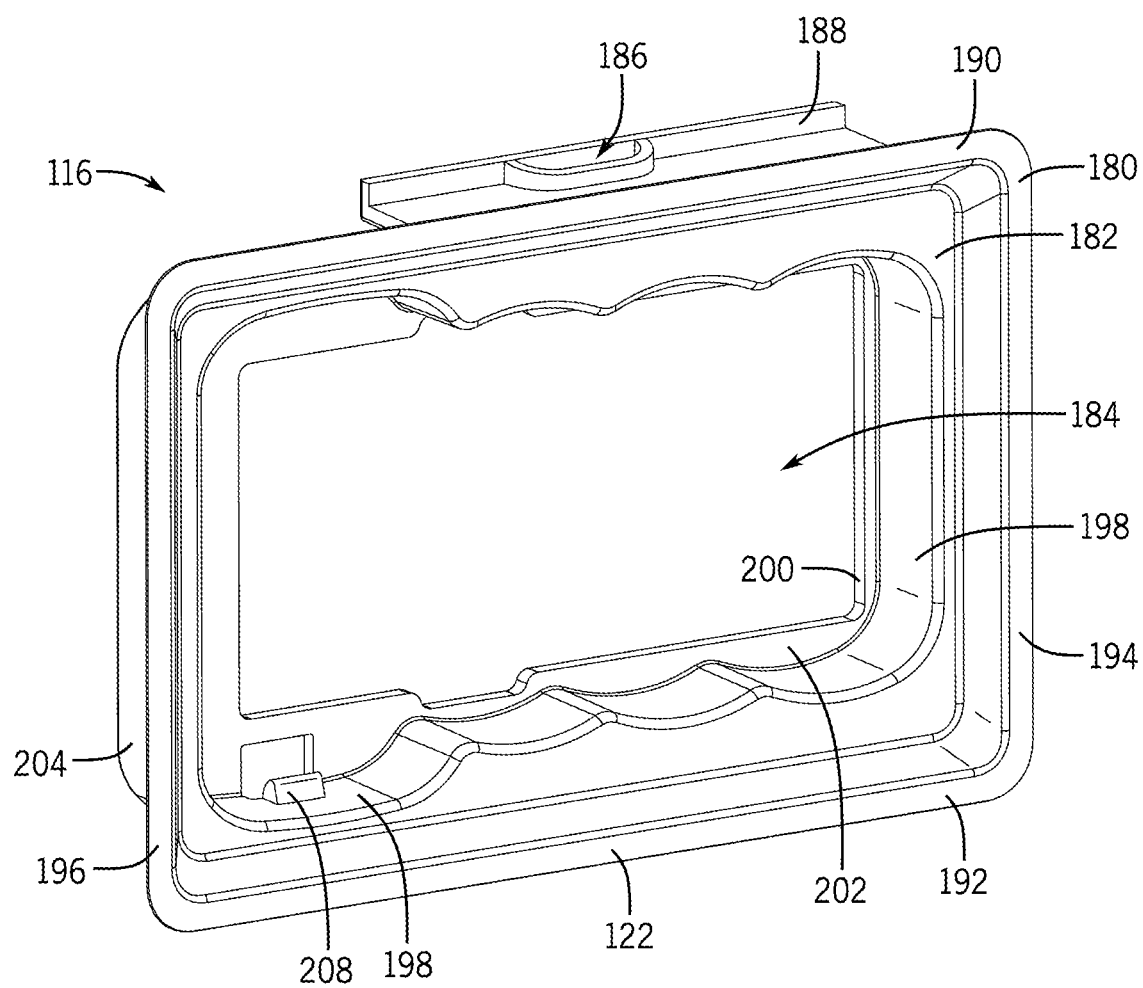
FIG. 3 is an isometric front, top, left side view of a panel for the valve-control assembly of FIG. 1.

In different embodiments, a second catch, as may correspond to a first catch on a control button, can be provided on a cover structure or other part (e.g., base portion) of a seat. In some embodiments, a second catch can be provided on a switch panel that is designed to at least partly surround the relevant control button. Referring to FIG. 3, for example, the switch panel 116 is generally rectangular and includes a perimeter edge 180 surrounding an intermediate surface 182 and a hole 184. The perimeter edge 180 includes a pocket 186, and a backing member 188 that extends in parallel with a top member 190. The walls of the pocket 186 can be configured to engaged (e.g., with a snap-fit) features on the cover panel 114 to help secure the switch panel 116 thereto.

Still referring to FIG. 3, the perimeter edge 180 further includes a bottom member 192 and two side members 194, 196 that connect the top member 190 to the bottom member 192. Within the perimeter edge 180, the intermediate surface 182 is formed with inner walls 198 extending generally perpendicularly away from the intermediate surface 182 to surround the control switches 130, 132, as illustrated in FIG. 3. The hole 184 is defined by an internal edge 200 of a generally planar pane 202, which also abuts the inner walls 198 of the intermediate surface 182.

As further illustrated in FIGS. 4 and 5, the inner walls 198 have an exterior 204 with a lip 206 (see FIGS. 4 and 5) that extends generally perpendicularly away from the exterior 204, below the perimeter edge 180. Thus arranged, for example, the switch panel 116 can be secured to the cover panel 114 by pressing the cover panel 114 against the perimeter edge 180 and above the lip 206, such that the switch panel 116 nests within the cover panel 114. In this manner, the switch panel 116 can snap into place within the cover panel 114 so that the cover and switch panels 114, 116 can be manipulated as a single component.

Due to its close proximity to the rocker switch 130, a second catch can usefully be provided on the switch panel 114 although, as also noted above, other configurations are possible. For example, referring again to FIG. 3, a second catch 208 extends away from the inner walls 198 generally toward the hole 184. The second catch 208 is positioned between, and at a predetermined spacing from, the pane 202 and the intermediate surface 182. Accordingly, as also described below, the catch 208 can engage the first catch 166 (see FIG. 2) upon actuation of the rocker switch 130 to temporarily hold the rocker switch 130 in a particular orientation.

A catch such as the second catch 208 can be formed on a variety of structures in a variety of ways. For example, as illustrated in FIG. 3, the second catch 208 is integrally formed as part of the switch panel 116 as a solid, fixed triangular tab or detent with a generally flat engagement face. In other embodiments, however, other configurations are possible. For example, a catch may be integrally formed as part of the cover panel 114 or another structure of the base portion 104 of the seat 100. Similarly, the second catch 208 may be separately formed and then attached to the cover panel 114, the switch panel 116, or another structure. Further, in different embodiments, the second catch 208 (like the first catch 166) may be formed with rectangular, triangular, trapezoidal, or any number of other shapes or may be configured as a hook, an extended lip, a recess, and so on.

In some embodiments, a catch can be disposed elsewhere on the switch panel 116, such as on the pane 202, as may dispose the catch to appropriately engage a particular catch on the rocker switch 130 or other control button. Optionally, multiple catches can be provided on the switch panel 116 or other component of a seat base, including on one or more surfaces thereof. For example, different catches on a seat base can be configured to engage different catches on a control button, or to engage the same catch on a control button to hold the control button at particular positions. In some embodiments, the second catch 208 or other corresponding feature can be manually (or otherwise) adjustable, such as being configured to be extendable or retractable by a user. In some embodiments, a second catch can be disposed elsewhere on the cover structure 110, such as on the cover panel 114.

Figure 5:
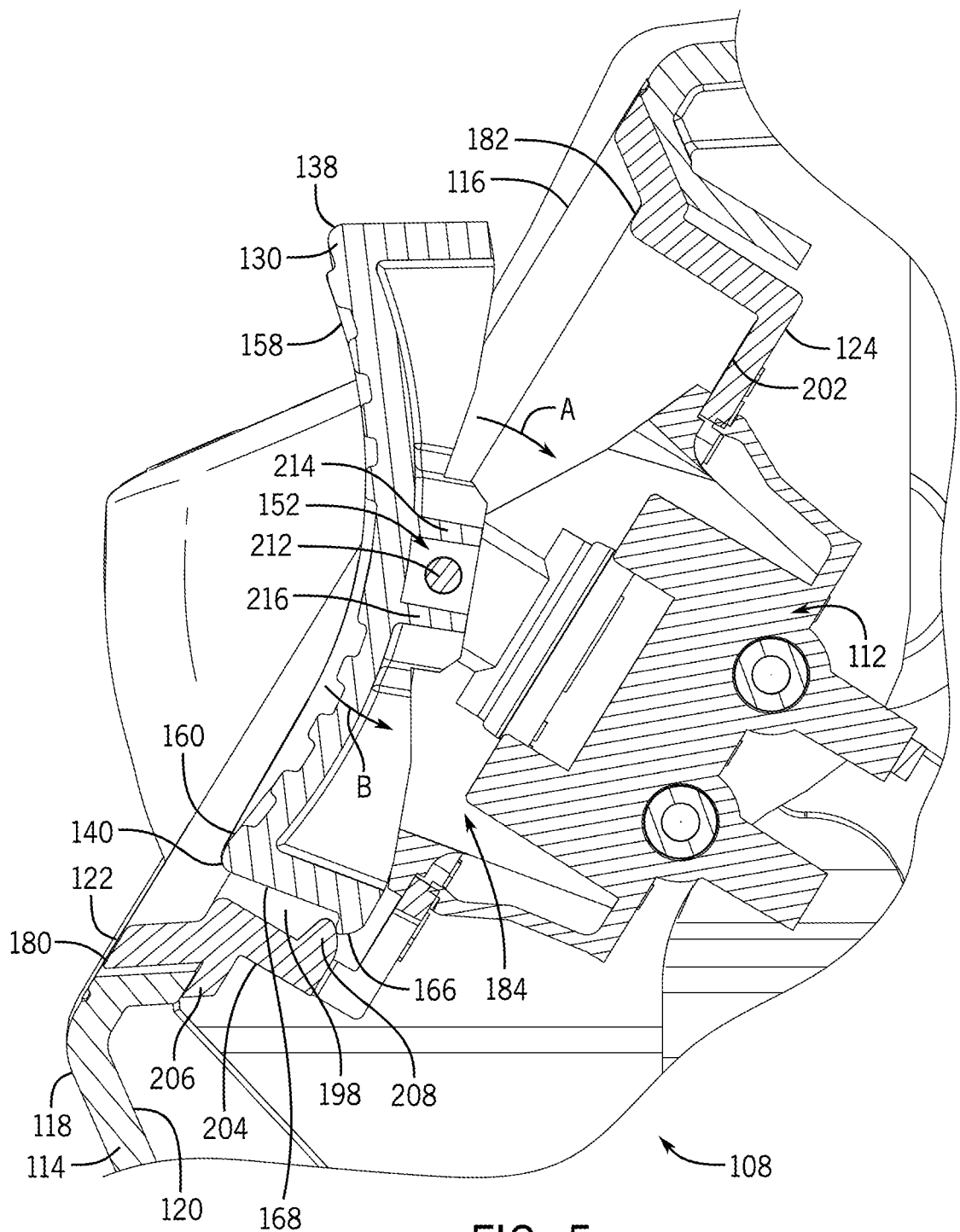
FIG. 5 is a sectional partial view of the valve-control assembly of FIG. 1 in an engaged state, taken along the lines 4-4 of FIG. 1.

FIGS. 4 and 5 illustrate aspects of the interoperation of the catches 166 and 208 to secure the rocker switch 130 in an engaged position. With the valve-control assembly 108 appropriately assembled, the rocker switch 130 is positioned within the switch panel 116 between the inner walls 198 and apart from the hole 184. The pneumatic control valve 112 is positioned within the hole 184 and can, in some embodiments, be thereby secured to the switch panel 116. Further, the rocker switch 130 is connected to the pneumatic control valve 112 at the pivot 152, which includes at least one pivot pin 212 inserted between a first arm 214 and a second arm 216 of the rocker switch.

Thus arranged, as the rocker switch 130 rotates about the pivot 152, such as indicated by arrows A and B, the rocker switch 130 can selectively actuate the pneumatic control valve 112 (e.g., cause the valve 112 to open or close), thereby controlling movement of compressed gases into or out of the seat (e.g., relative to a compressible gas reservoir for the seat). For example, a user can actuate the rocker switch 130 by pressing down on the top portion 158 or the bottom portion 160 of the front face 154, such that the rocker switch 130 rotates about the pivot 152 to open or close the pneumatic control valve 112, respectively. In the illustrated embodiment, in particular, the rocker switch 130 may rotate in a first direction (indicated by arrow A) or a second direction (indicated by arrow B) in order to operate the pneumatic control valve 112 to raise or lower the vehicle seat 100, respectively. In other embodiments, however, other configurations are possible. For example, the rocker switch 130 or other control buttons can be configured to be otherwise actuated to control any variety of other seat adjustments.

As also illustrated in FIGS. 4 and 5, the bottom end 168 of the rocker switch 130, including the first catch 166, is located circumferential alignment with the second catch 208 of the inner walls 198 relative to the rotational path of the rocker switch 130. As guided by the pivot 152, when the rocker switch 130 is actuated by pressing on the bottom portion 160 of the front face 154, the first catch 166 travels in the second direction toward the second catch 208. With sufficient rotation of the rocker switch 130, as illustrated in FIG. 5 in particular, the first catch 166 may be rotated in the second direction beyond the second catch 208, causing the first catch 166 to become secured underneath the second catch 208. Thus, for example, via engagement of the first catch 166 with the second catch 208, the rocker switch 130 can be secured against rotation in the first direction by forces exerted between the first and second catches 166, 208.

In this manner, the first catch 166 is configured to engage the second catch 208 when the rocker switch 130 is actuated by a predetermined amount, to secure the rocker switch 130 against movement. Accordingly, the second catch 208 can engage the first catch 166 to secure the pneumatic control valve 112 in a particular configuration. In the embodiment illustrated, as also discussed above, movement of the rocker switch 130 in the second direction causes the control valve 112 to open, which in turn causes the vehicle seat 100 to be lowered. Thus, engagement of the first and second catches 166, 208 can cause the pneumatic control valve 112 to be temporarily held open, such that the vehicle seat 100 automatically lowers to a particular level (e.g., to a fully lowered position) without continuous engagement of the rocker switch 130 by a user.

Still referring to FIG. 5, the rocker switch 130 is also configured to be manually actuated to disengage the first catch 166 from the second catch 208. For example, with the catches 166, 208 engaged, a user can press on the top portion 158 of the front face 154 of the rocker switch 130 to cause rotation in the first direction about the pivot 152. Once the user exerts sufficient force to overcome the engagement between the first catch 166 and the second catch 208, the rocker switch 130 can rotate in the first direction, whether to merely stop the lowering of the vehicle seat 100 or to further operate the pneumatic control valve 112 to raise the vehicle seat 100.

In some embodiments, it may be useful to configure catches to appropriately balance secure engagement and relatively easy actuation by a user. For example, as illustrated in FIGS. 4 and 5, the angled portion of the triangular tabs that form each of the catches 166, 208 are configured to contact the generally planar engagement surfaces of the other of the catches 208, 166 as the rocker switch 130 is moved in either of the first or second directions. This contact can help to induce appropriate elastic deformation of one or both of the rocker switch 130 (e.g., at the bottom end 168) or the switch panel (e.g., at the inner wall 198) to allow the catch 166 to move past the catch 208 without excessive resistance. In other embodiments, however, other configurations are possible.

In some embodiments, as also noted above, similar configurations and concepts may be implemented relative to other buttons (e.g., other switches) to control height adjustments or other seat-adjustment functions. For example, in some embodiments, a different button may be used to adjust the height of the vehicle seat 100. Still further, the actions described in connection with the rocker switch 130 may be used to perform additional or alternative seat adjustment functions. For example, in some embodiments, multiple seat adjustment functions may be performed simultaneously, iteratively, automatically, or otherwise, including through operation or a single or multiple control buttons.

As another example, in some embodiments, a different point (or points) of engagement can be provided for corresponding catches on a control button and a vehicle seat. For example, with reference to FIGS. 4 and 5, the predetermined amount of actuation that is require to engage the catches 166, 208 is determined in part by the locations of the second catch 208 on the inner wall 198 of the switch panel 116 and of the first catch 166 on the bottom end 168 of the rocker switch 130. In other embodiments, different locations or other configurations can allow catches to engage each other after different predetermined amounts of movement of a relevant button.

In addition to convenient operational functionality for users, it may also be useful to improve vehicle seats relative to maintenance or other related activities. In some embodiments, for example, aspects of a cover structure can facilitate relatively easy access to components of the vehicle seat 100. For example, to assist with maintenance or other tasks, the cover structure 110 is configured to be manually removable from outside the vehicle seat 100, such as through the use of a simple hand tool. Accordingly, users can readily remove the cover structure 110 in order to access the pneumatic control valve 112 or other components included in the base portion 104.

Figure 6:
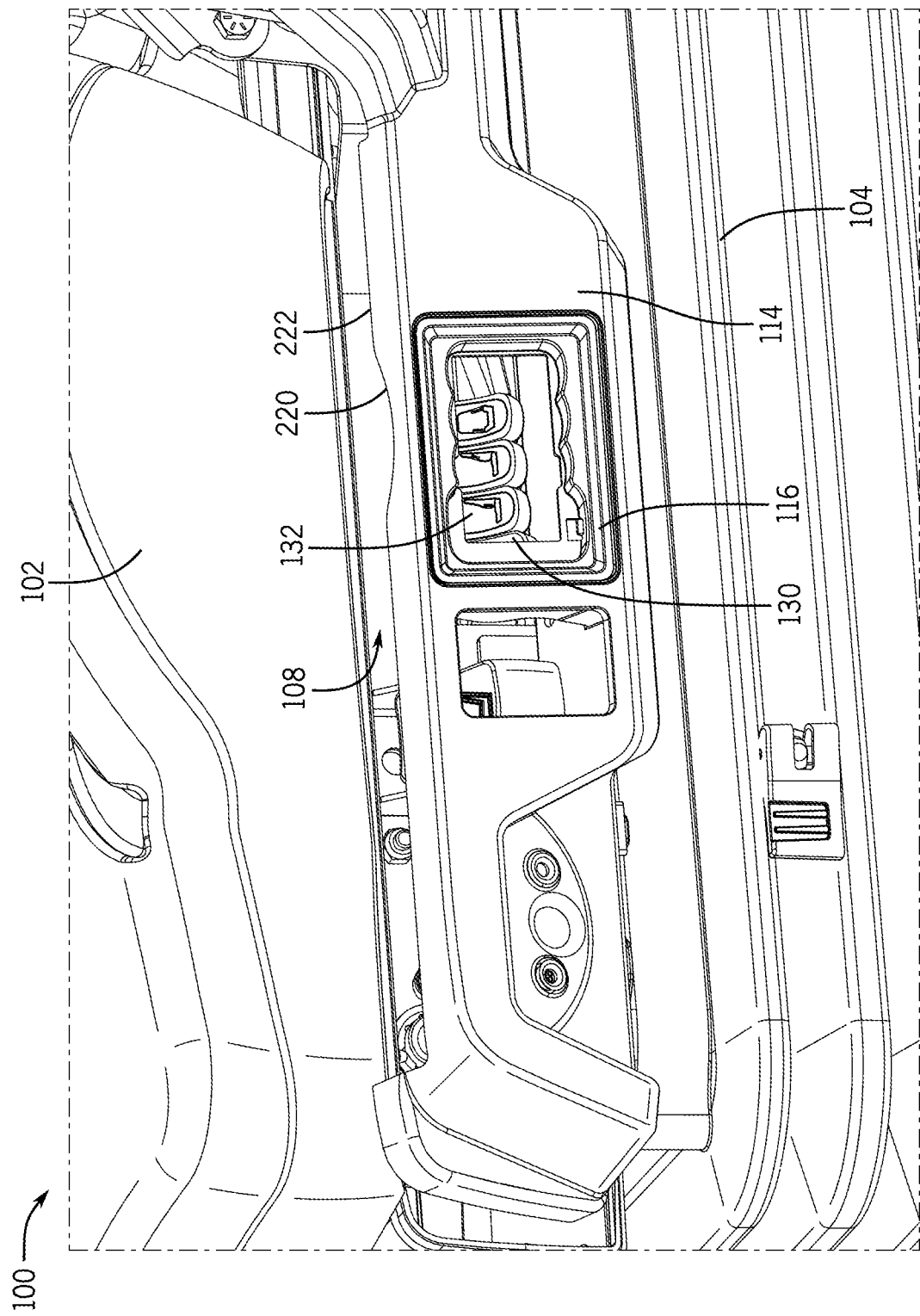
FIG. 6 is an isometric partial view of the valve-control assembly of FIG. 1 in a partially disassembled state.

Referring now to FIG. 6, in particular, the valve-control assembly 108 can be accessed relatively easily by removing the cover panel 114 from the base portion 104 of the vehicle seat 100. In particular, a notch 220 extends laterally along a top edge 222 of the cover panel 114 and is configured to receive part of a hand tool, such as a screwdriver head. As mentioned above, the cover panel 114 may be fastened to the vehicle seat 100 by snap-in fasteners, such as snap-fit pegs or clasps, or other known fasteners that can be operated without requiring direct engagement by tools. Accordingly, for example, with a hand tool positioned within the notch 220 to provide suitable leverage, the cover panel 114 can be relatively easily pried off of the vehicle seat 100. For example, prying action from such a hand tool can cause snap-in fasteners (not shown) to be removed from corresponding receptacles on the cover panel 114 or the base portion 108 of vehicle seat 100, thereby allowing the cover panel 114 to be detached. In some embodiments, the cover panel 114 can be thus detached with a generally pivoting movement, as partially illustrated in FIG. 6.

In some embodiments, a cover structure (e.g., the cover panel 114) can be secured using threaded fasteners or other similar devices in addition, or as an alternative, to snap-in fasteners. In such a case, for example, removing the cover structure may include a combination of manual or other direct unfastening of certain fasteners in combination with a prying of the cover structure away from a seat via engagement of a tool with a notch (e.g., the notch 220).

Generally, removal of the cover panel 114 may facilitate useful access to the pneumatic control valve 112 or other components of the control valve assembly 106. In some embodiments, the switch panel 116 can remain secured to the cover panel 114 during removal of the cover panel 114.

Accordingly, the cover panel 114 and the switch panel 116 may be removed together. In some embodiments, the switch panel 116 can be removed separately from the cover panel 114, such as by first removing the switch panel 116 from the cover panel 114 then, as appropriate, using the notch 220 to remove the cover panel 114 from the vehicle seat 100.

In different embodiments, different configurations for a cover structure and associated notch are possible. For example, the notch 220 of the cover panel 114 is integrally formed with the cover panel 114 as a crescent-shaped notch, as may allow for appropriate access with a relevant hand tool while not creating excessively large openings in the cover panel 114 as a whole. In other embodiments, however, other geometries or constructions are possible.

Thus, embodiments of the disclosed support and support system can provide various benefits compared to conventional vehicle seats. For example, in some embodiments, appropriately configured notches on cover structures can allow improved access to control valves and other components, for maintenance or other activities. As another example, sets of catches on control buttons (e.g., switches) and other seat components (e.g., cover structures) can be configured to interoperate to secure a valve control in a particular configuration. This may be useful, for example, to cause a seat to automatically lower to a particular position without continuous engagement of a control button by a user. In this regard, for example, users can more quickly and efficiently enter and exit the vehicle seats, which can lead to greater comfort and ease of use.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A valve-control assembly for a vehicle seat, the valve-control assembly comprising:
    a pneumatic control valve configured to control at least one seat adjustment function;
    a control button configured to operate the pneumatic control valve; and
    a cover structure arranged to one or more of: at least partly cover the pneumatic control valve or at least partly surround the control button;
    the control button including a first tab; and
    the cover structure including a second tab;
    the first tab being configured to engage the second tab, when the control button is actuated by a predetermined amount, to secure the control button against movement and thereby secure the pneumatic control valve in an actuated configuration.

2. The valve-control assembly of claim 1, wherein the at least one seat adjustment function controlled by the pneumatic control valve is a height adjustment for the vehicle seat.

3. The valve-control assembly of claim 2, wherein the valve-control assembly is configured to lower the vehicle seat when the pneumatic control valve is in the actuated configuration.

4. The valve-control assembly of claim 1, wherein the control button is configured to be manually engaged to disengage the first tab from the second tab.

5. The valve-control assembly of claim 4, wherein the control button is a control switch that is configured to be manually moved in a first direction to disengage the first tab from the second tab; and
    wherein the control switch is further configured to control the pneumatic control valve to raise a height of the vehicle seat via movement of the control switch in the first direction.

6. The valve-control assembly of claim 1, wherein the cover structure further includes a notch that is configured to receive a hand tool, from outside the vehicle seat, to remove the cover structure from the valve-control assembly.

7. The valve-control assembly of claim 6, wherein the cover structure includes a cover panel and a switch panel, the switch panel including the second tab and being secured to the cover panel to at least partly surround the control button.

8. The valve-control assembly of claim 7, wherein the pneumatic control valve is secured to the switch panel.

9. The valve-control assembly of claim 1, wherein the control button is a rocker switch.

10. The valve-control assembly of claim 9, wherein the first tab is formed on a bottom end of the rocker switch.

11. The valve-control assembly of claim 1, wherein the control button is included in a plurality of manual controls for a plurality of seat adjustment functions.

12. A valve-control assembly for a vehicle seat with a control valve that is configured to control at least one seat adjustment function, the valve-control assembly comprising:
    a control switch configured to be manually actuated to operate the control valve; and
    a cover structure arranged to one or more of: at least partly cover the control valve or at least partly surround the control switch;
    the control switch including a switch body and a first catch integrally formed with the switch body;
    the cover structure including a switch panel and a second catch integrally formed with the switch panel; and
    the first catch being configured to engage the second catch, when the control switch is actuated by a predetermined amount, to secure the control switch against movement and thereby secure the control valve in a first configuration.

13. The valve-control assembly of claim 12, wherein the first catch is formed as a first solid tab and wherein the second catch is formed as a second solid tab.

14. The valve-control assembly of claim 13, wherein the cover structure further includes a cover panel; and
    wherein the switch panel is configured to nest within part of the cover panel.

15. The valve-control assembly of claim 14, wherein the switch panel is configured to at least partly surround a plurality of manual controls for a plurality of seat adjustment functions.

16. The valve-control assembly of claim 15, wherein the control switch is configured to control a height adjustment of the vehicle seat; and
    wherein the first catch is configured to engage the second catch when the control switch is actuated to fully lower the vehicle seat.

17. The valve-control assembly of claim 14, wherein the cover panel includes a notch that is configured to receive a hand tool, from outside the vehicle seat, to remove the cover structure from the valve-control assembly and thereby provide access to the control valve.

18. A vehicle seat comprising:
a seat portion;
a base portion that supports the seat portion;
a valve assembly included in the base portion, including a first pneumatic control valve;
a control switch included in the base portion, the control switch including a first catch and being configured to operate the first pneumatic control valve to raise or lower the seat portion; and
a second catch included on the base portion;
the first catch being configured to engage the second catch, when the control switch is actuated by a predetermined amount, to secure the control switch against movement and thereby secure the first pneumatic control valve to fully lower the seat portion.

19. The vehicle seat of claim 18, wherein the base portion further includes a cover structure;
wherein the second catch is integrally formed as part of the cover structure; and
wherein the first catch is integrally formed as part of the control switch.

20. The vehicle seat of claim 19, wherein the cover structure includes a notch that is configured to receive a hand tool, from outside the vehicle seat, to remove the cover structure from the base portion and thereby provide access to the valve assembly.

* * * * *